Oct. 22, 1929.　　　　C. HEUZE　　　　1,732,889
PROCESS AND APPARATUS FOR THE MANUFACTURE OF GLASS
Filed June 18, 1928　　2 Sheets-Sheet 1
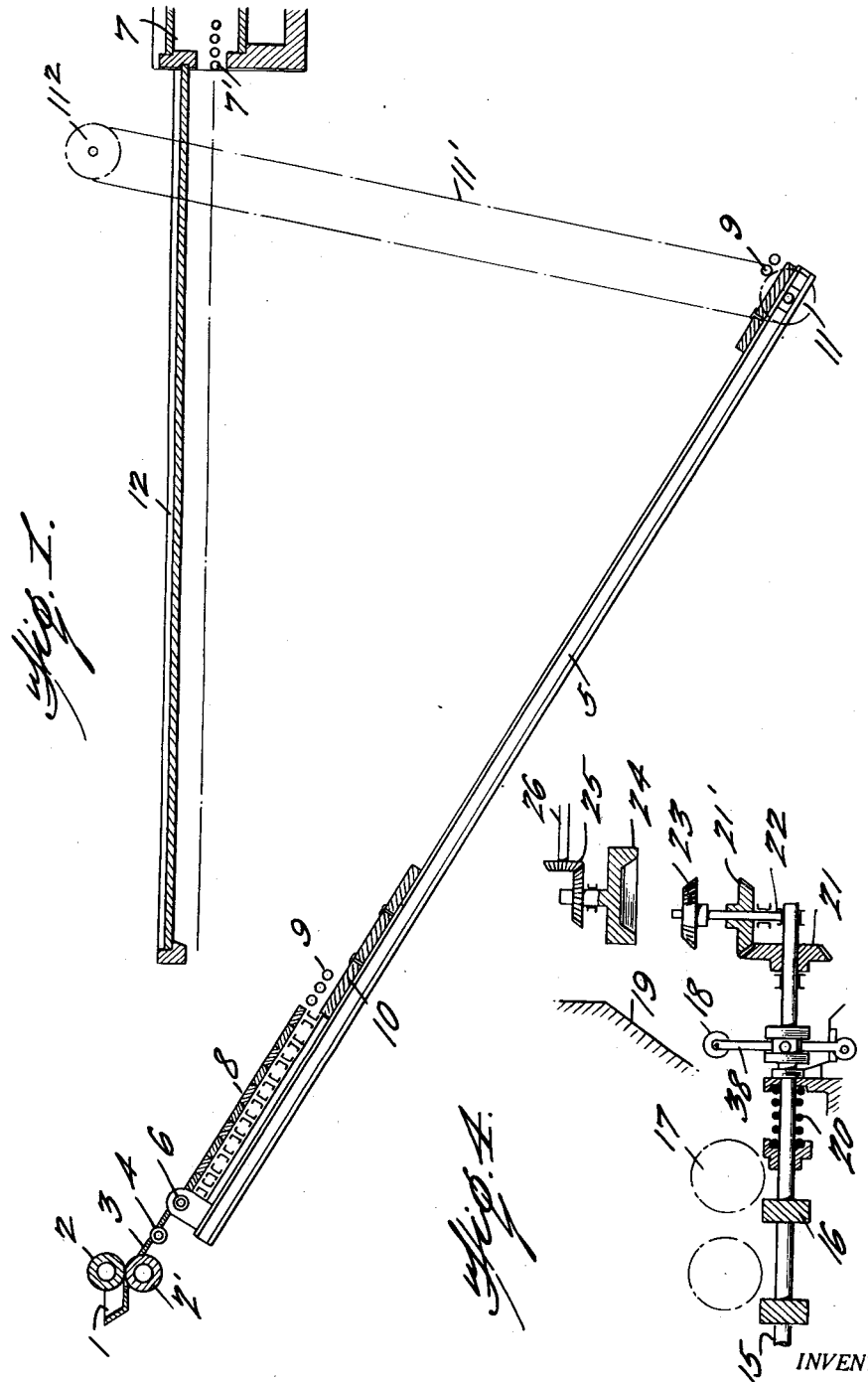
INVENTOR.
CHARLES HEUZE
BY
ATTORNEY.

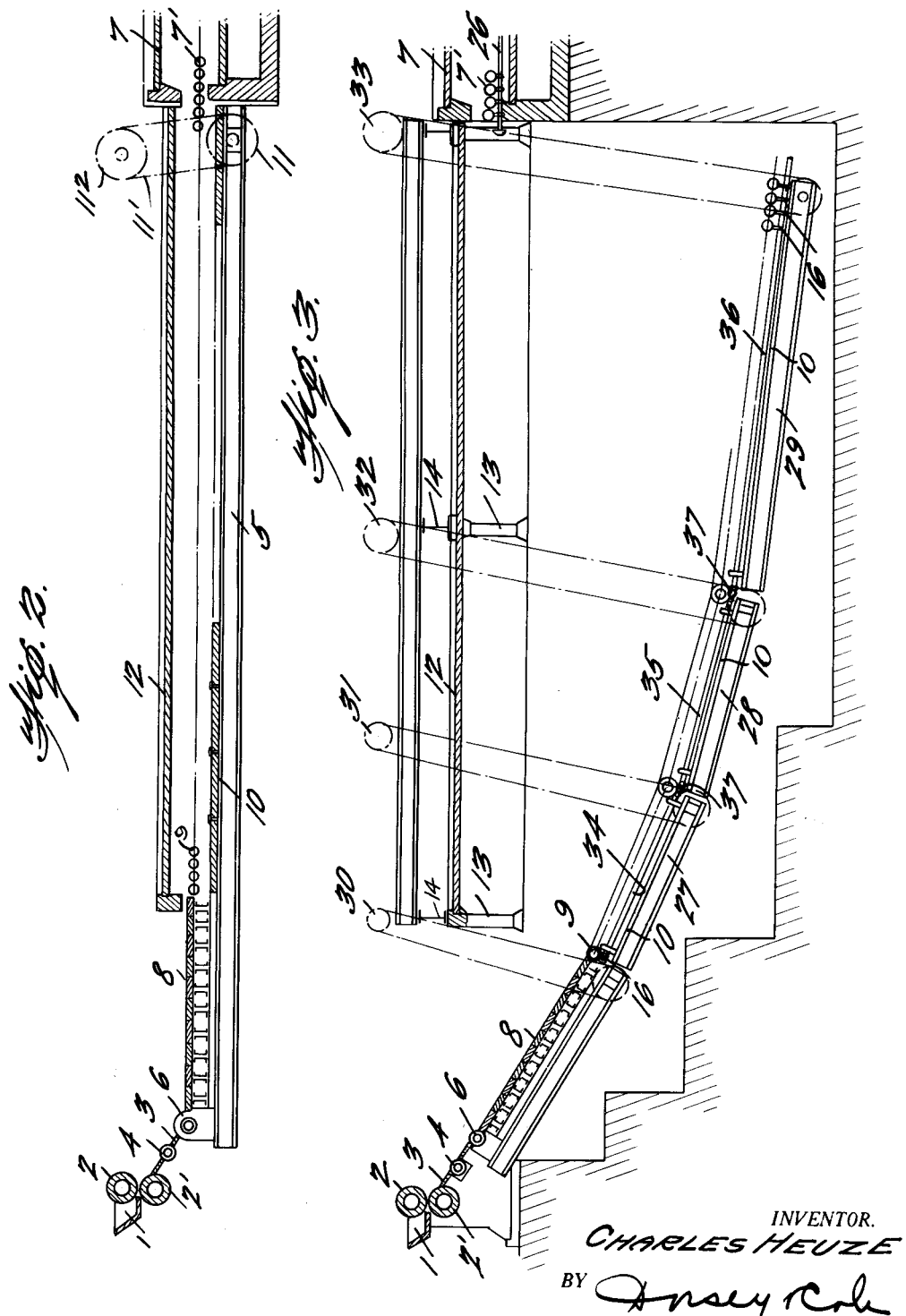

Patented Oct. 22, 1929

1,732,889

UNITED STATES PATENT OFFICE

CHARLES HEUZE, OF AUVELAIS, BELGIUM, ASSIGNOR TO THE AMERICAN BICHEROUX COMPANY, A CORPORATION OF DELAWARE

PROCESS AND APPARATUS FOR THE MANUFACTURE OF GLASS

Application filed June 18, 1928, Serial No. 286,395, and in Belgium March 3, 1928.

The invention relates to receiving glass sheets intermittently formed and the delivery of such sheets to a lehr.

It is known that the formation of the sheet should be done at great or relatively great speed compared to the speed at which the plate treats in annealing. The latter is necessarily slow in order to avoid making the annealing apparatus of great length; and this invention relates to a process and an apparatus which, in simple manner, permits of forming the plates or sheets at high speed and then annealing them while traveling at reduced speed.

For this purpose it comprises as the sheet is formed, in delivering it onto an inclined runway provided with sheet carrying rollers so that the forward movement of the glass is effected at first under the action of gravity, and in modifying the inclination of this platform so that once the sheets or plates are completely delivered to the runway, they can be introduced into an annealing apparatus at the speed at which they are to move in this apparatus.

It also comprises in modifying or changing the inclination of the runway so as to compensate for the acceleration due to gravity.

In certain cases, in order to reduce the drop in level of the end of the runway, it comprises also in constructing this latter of a series of pivoted sections and of progressively decreasing inclination, the rising movement of the sections being regulated so that they reach the horizontal position together.

It also comprises in providing means so that the horizontal position once reached the sheet or plate is carried along by the rollers, at annealing speed.

In addition to the process set forth, the invention comprises apparatus suitable for carrying out such process. In the following specification a suitable apparatus is described in detail with reference to the accompanying drawings which show various embodiments of the invention.

On said drawings:

Fig. 1 is a diagram in longitudinal section of an intermittent forming device, with an inclined tilting receiving runway located in front of a lehr, in accordance with one embodiment of my invention.

Fig. 2 is a view similar to that of Fig. 1, the platform or chassis being shown raised in position for the introduction of the sheet into the lehr.

Fig. 3 is a diagram similar to Fig. 1, the runway being formed of a plurality of pivoted sections.

Fig. 4 shows diagrammatically the details of the drive of the runway rollers for moving the sheets at annealing speed.

Referring to Figures 1 to 3 inclusive, the intermittent forming machine has the forming rollers 2 and 2', and a stationary apron 3, preferably provided with a roller 4, so that the sheet or plate of glass made by the rollers 2 and 2' is delivered to the runway 5 which, at the beginning of the forming operation, occupies the inclined position as shown on Fig. 1.

This runway 5 is pivoted at 6 and comprises, near the end adjacent the rolling machine, a table such as 8 for smoothing or surfacing the sheet or plate, and following that a series of rollers 9 positioned therebehind and extending to the other end of the runway.

This platform has a suitable lifting system, diagrammatically shown at 11, 11' and 11², adapted to carry the platform into the horizontal position for the introduction of the sheet into the lehr 7, as shown on Fig. 2.

Assuming the runway in the position shown in Fig. 1, a sheet of glass is formed by the rolls 2 and 2' at a relatively high speed. The sheet slides down the apron 3 and over the table 8, onto the rollers 9, which at this time are free to rotate, and advances on these rollers at rolling speed, chiefly through the action of gravity.

When the entire sheet is upon the runway the runway is raised by means of the apparatus II, II¹, II² to the horizontal position shown on Fig. 2, in which the rollers 9, which have been heretofore free to rotate, are rotated mechanically so that their peripheral velocity corresponds to that of rollers 7' of the lehr, for introducing the sheet or plate into said apparatus.

If desired, the lifting of the runway may commence during the formation of the sheet, and be at such a rate as to compensate for the effects of gravity, so that the tendency to advance is exactly at the speed of rolling at all times and in all parts of the sheet being formed, and without subjecting the sheet to tensions which might be the cause of distortion.

In order to prevent the sheet from cooling too suddenly as it advances on the rollers 9, a shield 10 may be provided under the latter formed of plates of asbestos, or heating elements whereby the radiation of heat is more or less reduced. On the other hand, in order that annealing may begin as rapidly as possible after the rolling there is provided, as a vestibule to the lehr and in advance thereof, a roof 12, supported in any suitable manner, for example by columns such as 13, 14, below which the runway 5 comes into horizontal position.

And in order that the proper drive of the rollers 9 may be assured, there is provided (Fig. 4) along the runway 5 a longitudinally movable shaft 15 which carries worms 16 adapted to enter into engagement with worm gears 17 fast to rollers 9, the necessary longitudinal movement to ensure meshing of these parts being caused when the runway is lifted by roller 18 mounted on the lever 38, and a fixed cam 19 which moves the shaft against the tension of spring 20.

Shaft 15 is driven by the bevel pinions 21—21′, the latter integral with a shaft 22 carrying a cone clutch 23 adapted to engage in the female cone 24 connected with the train of pinions 25 and set in rotation by the shaft 26 driving the rollers 7′ of the annealing apparatus, so that as soon as the runway assumes the horizontal position all the rollers 9 and the rollers 7′ are simultaneously driven at the same peripheral velocity.

As may be seen from Fig. 1, if the runway 5 is of some length, the drop in level at its end may be considerable, which causes difficulties in installation on the one hand, and increase of drive due to gravity (which may be the cause of distortion of the sheet) on the other.

In order to obviate this the runway 5 may be made of a plurality of sections 27, 28 and 29, each of successively decreasing inclination, as shown on Fig. 3, each section being raised by a system such as II, II¹, II² as in Figures 1 and 2, or by the systems 30, 31, 32 and 33, to assume the horizontal position simultaneously.

The sections of the runway of this construction each carry a drive shaft 34, 35 and 36 for the rollers 9 of such sections, connected by universal joints or couplings 37, as shown, the shaft being controlled and driven as before described.

From the foregoing it will be seen that the rollers 9 are substantially free as soon as the runway 5 is removed from the horizontal position and are driven peripherally at the speed of rollers 7′ of the lehr when the platform or frame 5 occupies that position, by the shaft 26.

As is apparent, the cover 12 may be extended laterally toward the bottom by fixed or removable panels so as to regulate the preannealing of the sheet as desired. Also it is evident that the platform 5 may be pivoted intermediate of its length so as to rock or tip.

Having thus described my invention what I claim as new and desire to secure by Letters Patent, is:

1. The hereinbefore described method of forming and annealing glass sheets which comprises forming the sheet at a relatively high speed, delivering it to an inclined runway, subsequently reducing the speed of movement of the sheet by decreasing the inclination of the runway and delivering the sheet from the runway into an annealing device at such reduced speed.

2. The hereinbefore described method of forming and annealing glass sheets which comprises forming the sheet at a relatively high speed, delivering it to an inclined runway, permitting the sheet to move along the runway under gravity and controlling its movement by the inclination of the runway and delivering the sheet from the runway into an annealing device at a reduced speed.

3. The hereinbefore described method of forming and annealing glass sheets which comprises forming the sheet at a relatively high speed, delivering it to an inclined runway having a surface of freely revolving rollers, reducing the speed of movement of the sheet after such delivery by reducing the inclination of the runway and then positively rotating the rollers to deliver the sheet to an annealing device at a reduced rate of speed.

4. In an apparatus for forming and annealing glass sheets the combination with an intermittent forming machine, of a tiltable runway located adjacent to the forming machine and adapted to receive sheets therefrom when inclined, a lehr, and means for varying the inclination of the runway and placing it in a substantially horizontal position in alignment with the lehr.

5. In an apparatus for forming and annealing glass sheets the combination with an intermittent forming machine, of a runway having a surface formed by rollers and located to receive a sheet of glass when inclined, a lehr, means for causing the runway to assume a substantially horizontal position in front of the lehr and means for rotating at such time the rollers of the runway to deliver the sheets from the runway into the lehr at a reduced speed.

6. In an apparatus for forming and annealing glass sheets the combination with an intermittent forming machine of a tiltable runway located adjacent to the forming machine and adapted to receive sheets therefrom when inclined, a portion of the surface of which is formed by a plate and a portion by a series of rollers, a lehr, means for causing the runway to assume a substantially horizontal position in front of the lehr and means for rotating at such time the rollers of the runway to deliver the sheets from the runway into the lehr at a reduced speed.

7. In an apparatus for forming and annealing glass sheets the combination with an intermittent forming machine, of a runway consisting of a series of pivoted sections pivoted to move in a vertical plane and located to receive glass from the forming machine when inclined, a lehr, means for causing the runway to assume a substantially horizontal position in front of the lehr and means for rotating at such time the rollers of the runway to deliver the sheets from the runway into the lehr at a reduced speed.

8. In an apparatus for forming and annealing glass sheets, the combination with a rolling machine, of a tiltable runway and having a series of rollers to receive a sheet while the runway is in an inclined position, means to raise this runway to a horizontal position opposite the entrance of a lehr, a lehr having driving rolls therein, means for driving the rollers of the runway at the peripheral speed of that of the rollers of the lehr.

CHARLES HEUZE.